United States Patent
Kasama

(10) Patent No.: US 9,618,336 B2
(45) Date of Patent: Apr. 11, 2017

(54) MEASURING DEVICE AND MEASUREMENT METHOD

(75) Inventor: Kouichirou Kasama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 798 days.

(21) Appl. No.: 13/605,861

(22) Filed: Sep. 6, 2012

(65) Prior Publication Data

US 2013/0066590 A1 Mar. 14, 2013

(30) Foreign Application Priority Data

Sep. 12, 2011 (JP) .................................. 2011-198869

(51) Int. Cl.
G01B 17/06 (2006.01)
G01S 15/10 (2006.01)

(52) U.S. Cl.
CPC .............. *G01B 17/06* (2013.01); *G01S 15/10* (2013.01)

(58) Field of Classification Search
None
See application file for complete search history.

(56) References Cited

U.S. PATENT DOCUMENTS

| | | | | |
|---|---|---|---|---|
| 5,862,252 A | * | 1/1999 | Yamamoto | G01B 11/24 345/419 |
| 8,368,752 B2 | * | 2/2013 | Lin et al. | 348/140 |
| 2008/0101784 A1 | * | 5/2008 | Hsu | 396/89 |
| 2010/0216551 A1 | * | 8/2010 | Dwyer | A63F 13/06 463/36 |

FOREIGN PATENT DOCUMENTS

| | | |
|---|---|---|
| JP | 06-331342 A | 12/1994 |
| JP | 2001-066135 A | 3/2001 |
| JP | 2005-315820 A | 11/2005 |
| JP | 2006-038746 A | 2/2006 |
| JP | 2006-292634 | 10/2006 |
| JP | 2008-145321 A | 6/2008 |

OTHER PUBLICATIONS

Office Action of Japanese Patent Application No. 2011-198869 dated Aug. 18, 2015. Translation of the relevant part of the Office Action.

Office Action of Japanese Patent Application No. 2011-198869 dated Jan. 27, 2015 with Partial Translation.

\* cited by examiner

*Primary Examiner* — Aditya Bhat

(74) *Attorney, Agent, or Firm* — Maschoff Brennan

(57) ABSTRACT

There is provided a measuring device that includes a first measuring unit that measures a distance between a measurement reference point and an intersection of a plane and a line passing through the measurement reference point, a calculator that calculates angles formed by the plane and the intersection; and a second measuring unit that measures an object using data of the distance or the angles.

1 Claim, 9 Drawing Sheets

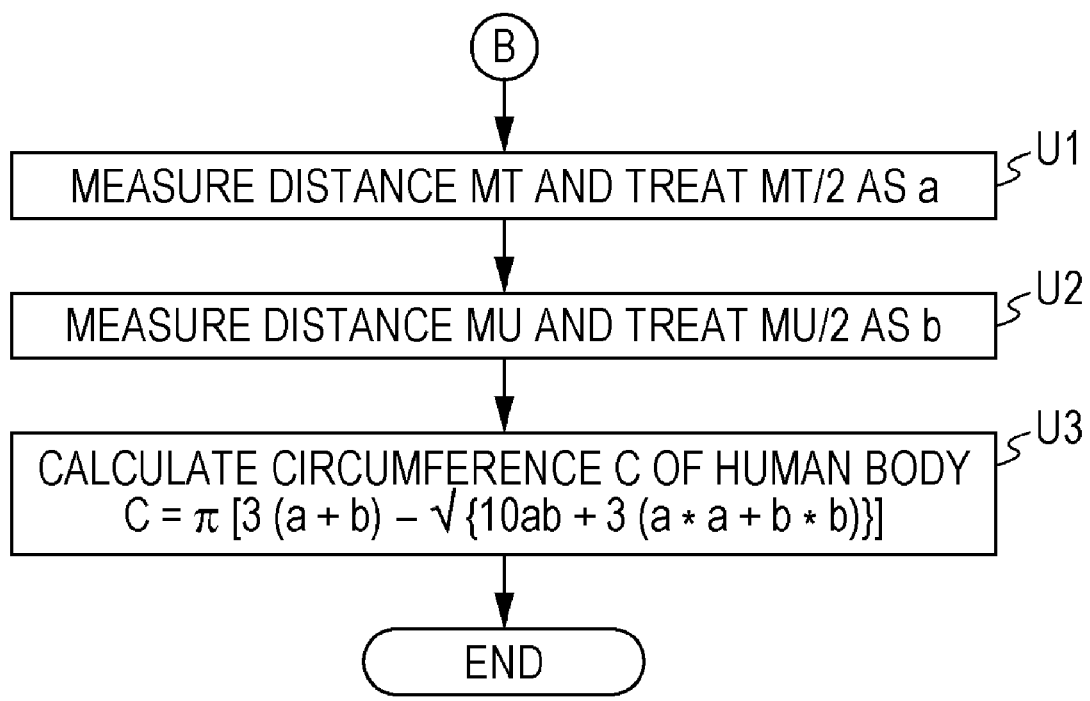

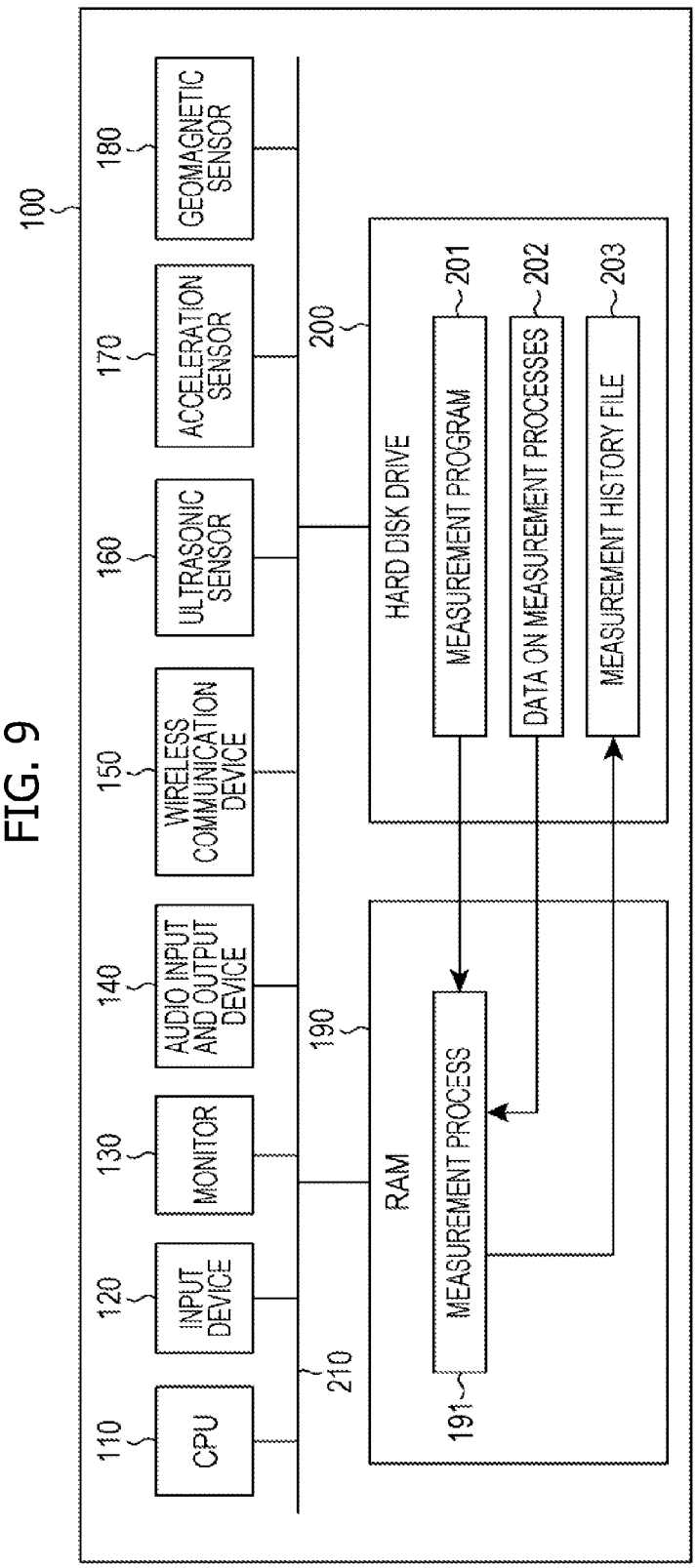

MEASURING DEVICE AND MEASUREMENT METHOD

CROSS-REFERENCE TO RELATED APPLICATION

This application is based upon and claims the benefit of priority of the prior Japanese Patent Application No. 2011-198869, filed on Sep. 12, 2011, the entire contents of which are incorporated herein by reference.

FIELD

The embodiment discussed herein is related to a measuring device and a measurement method.

BACKGROUND

There is a conventional technique using an ultrasonic sensor or an optical distance sensor to measure a distance between the sensor and an object and thereby measure the length, width and height of the object. For a device using the technique for measuring each of sides of a cuboid or rectangular parallelepiped, there is a technique in which a wire is used for measuring a distance between two points of a diagonal line of the object and the ultrasonic sensor is used for measuring the height of the object and an angle between the diagonal line and a wall is calculated on the basis of calculation of an angle between the wire and the wall. In addition, as a technique for measuring the circumference of an ellipse, there is a technique in which a frame with optical distance sensors arrayed on the frame are used for measuring lengths of major and minor axes of the ellipse, thereby an outer circumference and a cross-sectional area of the ellipse are obtained.

Japanese Laid-open Patent Publications Nos. 06-331342, 2005-315820, and 2008-145321 are examples of related art.

SUMMARY

According to an aspect of the invention, a measuring device includes a first measuring unit that measures a distance between a measurement reference point and an intersection of a plane and a line passing through the measurement reference point, a calculator that calculates angles formed by the plane and the intersection, and a second measuring unit that measures an object using data of the distance or the angles.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating a computer that executes a measurement program; and FIG. 10 is a diagram illustrating an example of data stored in a human body circumference correction table.

DESCRIPTION OF EMBODIMENT

Among the aforementioned techniques described in the background, in the technique for measuring each of the sides of a rectangular parallelepiped, it takes a lot of time and efforts to measure each of the sides of the rectangular parallelepiped, and the size of the object to be measured is limited to a range in which the wire may be set. Thus, when the wire is not appropriately stretched to a place that a user's hand does not reach, the object is not appropriately measured. Even when the object is appropriately measured, an inconvenience occurs, for example, the wire might not be stretched by an operator alone. In the technique for measuring the circumference of an ellipse, it takes a lot of time and efforts to measure the circumference of the ellipse, the frame in which the optical distance sensors are arrayed is used, and the number of the optical distance sensors to be used is large. Thus, the cost for a device increases, and the size of the ellipse to be measured is limited.

Hereinafter, an embodiment of a measuring device and a measuring method disclosed herein is described below with reference to the accompanying drawings. The measuring device and the measurement method disclosed herein are not limited to the embodiment.

Figure 1:
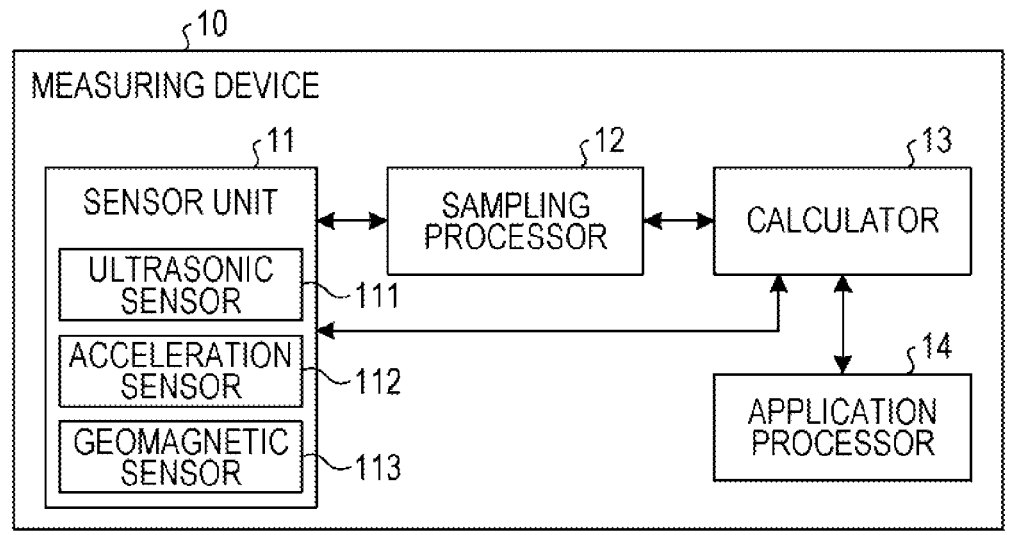
FIG. 1 is a diagram illustrating a functional configuration of a measuring device.

A functional configuration of a measuring device 10 according to the embodiment disclosed herein is described. FIG. 1 is a diagram illustrating the functional configuration of the measuring device 10 according to the embodiment. As illustrated in FIG. 1, the measuring device 10 includes a sensor unit 11, a sampling processor 12, a calculator 13 and an application processor 14. The above-mentioned elements are connected to each other so that the elements may transmit signals or data to each other unidirectionally or bidirectionally.

The sensor unit 11 includes an ultrasonic sensor 111, an acceleration sensor 112 and a geomagnetic sensor 113. The ultrasonic sensor 111 is a non-contact sensor that periodically emits in a direction a predetermined number of pulses of ultrasonic wave of a predetermined frequency, for example, approximately in the range of 10 kHz to 50 kHz, and receives the ultrasonic wave reflected by an object. A detailed description on the acceleration sensor 112 is omitted because it is well known and generally used. The acceleration sensor 112 detects acceleration in three axial directions x, y, and z and calculates a direction of gravitational acceleration on the basis of the detected acceleration. The three axial directions are perpendicular to each other. The geomagnetic sensor 113 is a known sensor that is generally used, and a detailed description thereof is omitted. The geomagnetic sensor 113 detects a change in a number of geomagnetic lines crossing the measuring device 10, and calculates the magnitude and direction of a magnetic field on the basis of the magnetic flux density.

The sampling processor 12 periodically samples or extracts data such as a time taken to return of the ultrasonic wave, the acceleration values in the three axial directions or geomagnetic values in the three axial directions detected by the sensor unit 11, and outputs the extracted values to the calculator 13. It is preferable that intervals between the times for performing the sampling is, for example, 20 milliseconds or less in order to measure a distance and calculate an angle with high accuracy.

The calculator 13 calculates a distance between the measuring device 10 and the object such as a wall using the time data, which is detected by the ultrasonic sensor 111 as a turnaround time of the ultrasonic wave. The calculator 13 calculates angles of lines including three points and a position at which the measuring device 10 is installed, that is, a measurement reference point, where the calculation is performed by using the acceleration values obtained by the acceleration sensor 112 in the three axial directions and the geomagnetic values obtained by the geomagnetic sensor 113 in the three axial directions.

The application processor 14 selects a measurement mode from among a rectangular parallelepiped measurement mode and a human body circumference measurement mode in accordance with an instruction input by a user, and notifies the calculator 13 of the result of the selection. The application processor 14 causes a display device to display the results of measurements on a rectangular parallelepiped or a circumference of a human body performed by the calculator 13.

Figure 2:
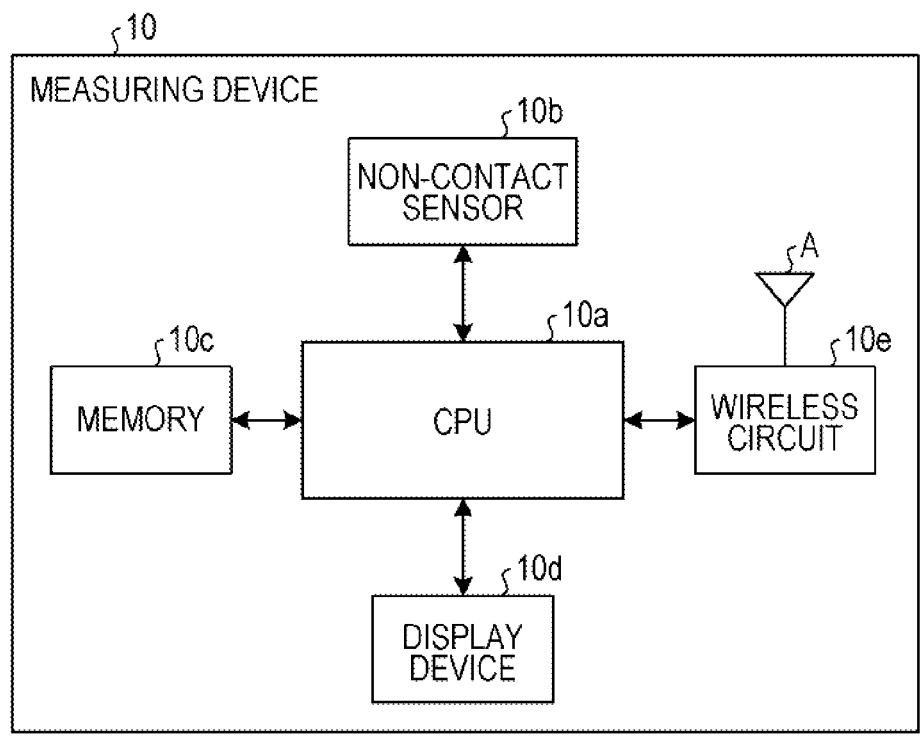
FIG. 2 is a diagram illustrating a hardware configuration of the measuring device.

The measuring device 10 is achieved by a mobile phone, for example. FIG. 2 is a diagram illustrating a hardware configuration of the mobile phone that serves as the measuring device 10. As illustrated in FIG. 2, the measuring device 10 includes a central processing unit (CPU) 10a, a non-contact sensor 10b, a memory 10c, a display device 10d, and a wireless circuit 10e that has an antenna A. The sensor unit 11 is achieved by the non-contact sensor 10b that includes an ultrasonic sensor, an acceleration sensor, and a geomagnetic sensor, as described above. The sampling processor 12, the calculator 13, and the application processor 14 are achieved by, for example, an integrated circuit such as the CPU 10a. The memory 10c stores sensing results, results of the calculation of the acceleration and the like, and results of the measurements of the rectangular parallelepiped and the circumference of the human body. The memory is a random access memory (RAM), a read only memory (ROM), a flash memory, or the like. The results of the measurements of the rectangular parallelepiped and the circumference of the human body are displayed on the display device 10d that includes a liquid crystal display (LCD) or the like.

Next, operations of the measuring device 10 are described. In order to explain the operations, it is assumed that the measuring device 10 is placed at a position, for example, near the rectangular parallelepiped or human body, at which the sensor unit 11 may measure the object.

Figure 3A:
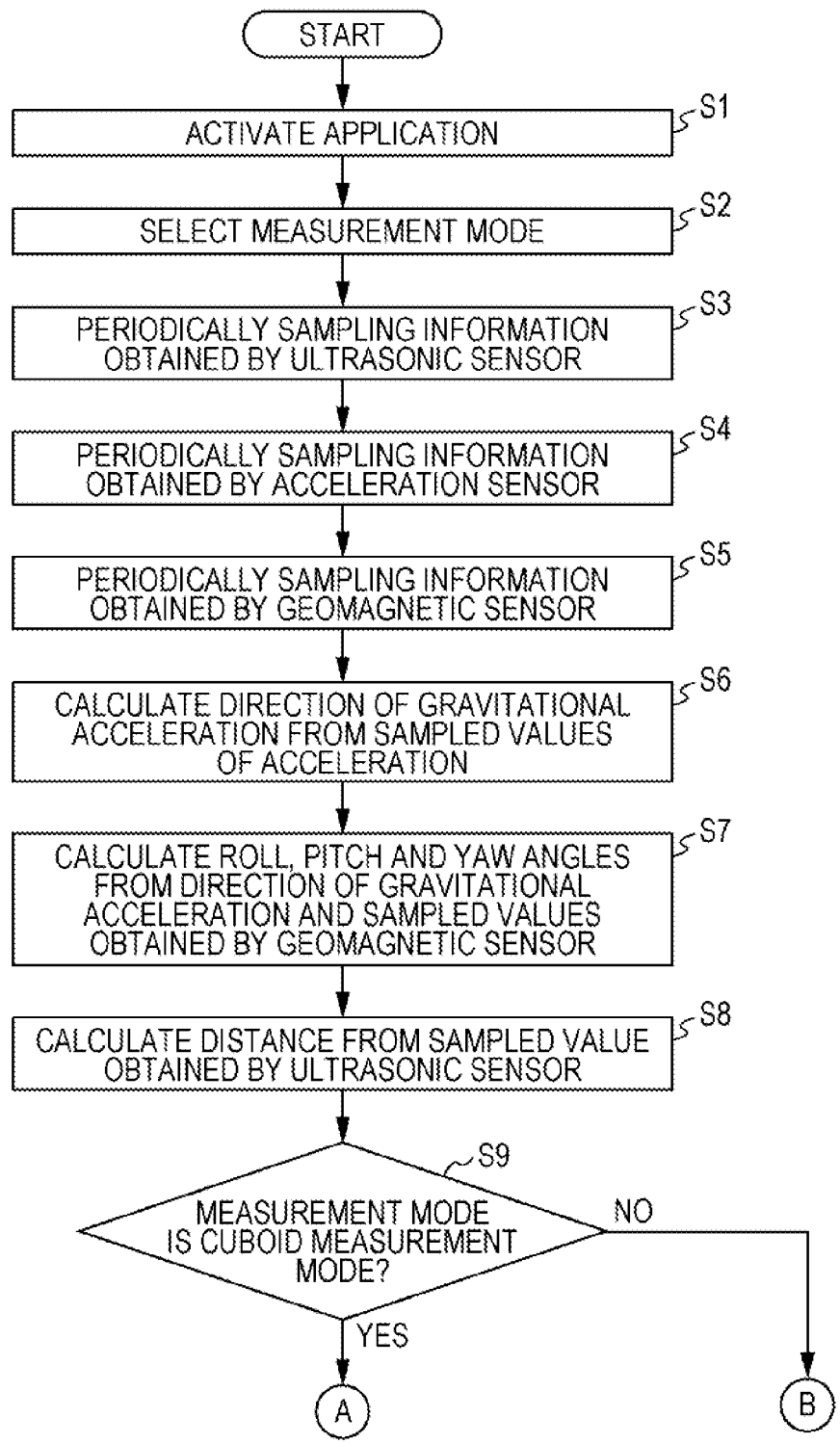
FIG. 3A is a flowchart of operations that are the basis of measurement processes.
Figure 3:
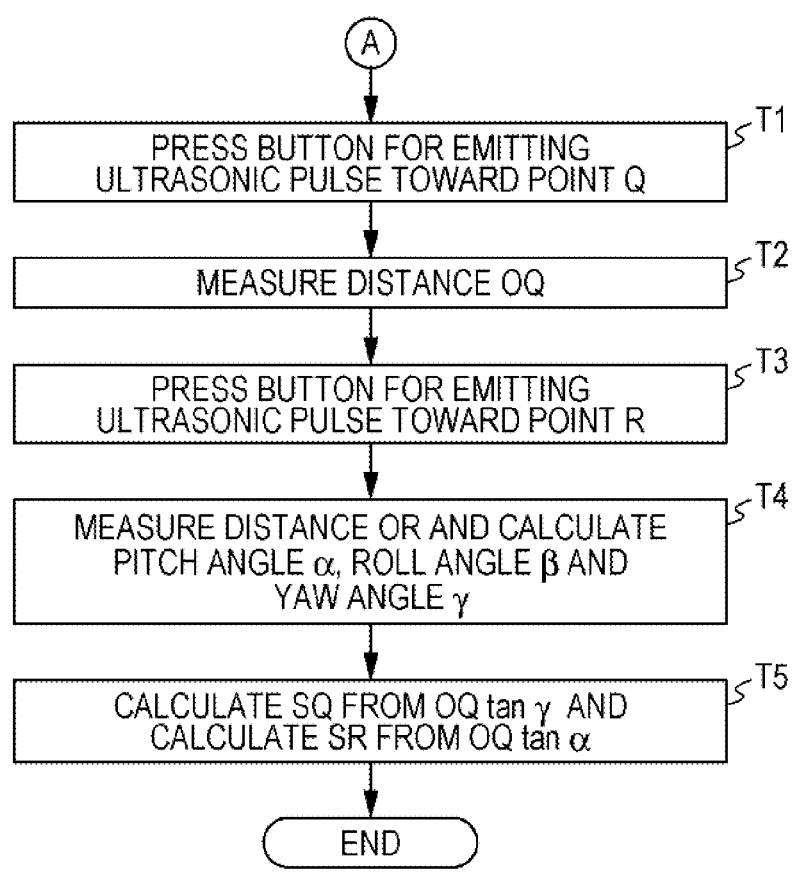
FIG. 3B is a flowchart of a measurement process that is performed in the rectangular parallelepiped measurement mode.
FIG. 3C is a flowchart of a measurement process that is performed in the human body circumference measurement mode.

FIG. 3A is a flowchart of the operations of the measuring device 10. When the user activates a measurement application of the measuring device 10 (S1), the measuring device 10 stands by until the user selects a measurement mode.

When the measuring device 10 selects the measurement mode in accordance with an instruction input by the user (S2), the sampling processor 12 starts the sampling. The sampling is periodically performed on the basis of information input by the sensors of the sensor unit 11. Specifically, the sampling processor 12 periodically extracts sensing results each of which are obtained by the ultrasonic sensor 111 (S3), the acceleration sensor 112 (S4), and the geomagnetic sensor 113 (S5), respectively.

In S6, the calculator 13 calculates a direction of gravitational acceleration on the basis of the extracted acceleration values obtained in S4. Specifically, the calculator 13 calculates the average of the extracted acceleration values in each of the three axial directions, x, y and z, using the number of extractions. When the results of the calculation are Ax, Ay and Az, the direction of the gravitational acceleration is calculated using polar coordinates according to the following Equations (1) to (3).

$$\cos \theta = Az/\sqrt{(Ax*Ax+Ay*Ay+Az*Az)} \qquad (1)$$

$$\cos \phi = Ax/\sqrt{(Ax*Ax+Ay*Ay)} \qquad (2)$$

$$\sin \phi = Ay/\sqrt{(Ax*Ax+Ay*Ay)} \qquad (3)$$

In S7, the calculator 13 calculates roll, pitch, and yaw angles on the basis of the direction of the gravitational acceleration, which is calculated in S6, and the values of geomagnetic force which is extracted in S5 by the geomagnetic sensor 113. The rotation angle about the x, y, and z axes is defined as a roll, pitch and yaw angle, respectively. Subsequently, in S8, the calculator 13 calculates a distance between the measuring device 10 and the object, such as a wall, on the basis of values obtained in S3 by the ultrasonic sensor 111d. In S9, the application processor 14 determines whether the measurement mode selected in S2 is the rectangular parallelepiped measurement mode or the human body circumference measurement mode, and starts a process for the selected measurement mode on the basis of the result of the determination.

Figure 4:
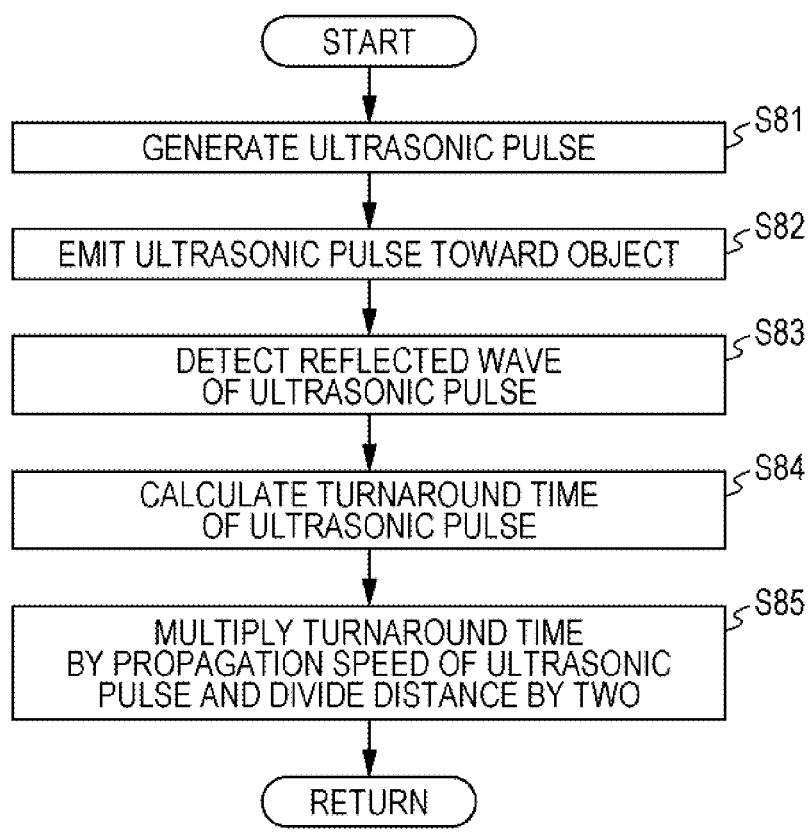
FIG. 4 is a flowchart of a distance calculation process that is performed using an ultrasonic sensor.

FIG. 4 is a flowchart performed in S8 for a distance calculation process performed by using the ultrasonic sensor 111. When the ultrasonic sensor 111 generates an ultrasonic pulse of a predetermined frequency, for example, 100 kHz (S81), the ultrasonic sensor 111 emits the ultrasonic pulse toward the object such as the wall (S82). When the ultrasonic sensor 111 detects the wave reflected by the object (S83), the ultrasonic sensor 111 notifies the calculator 13 that the ultrasonic sensor 111 has detected the reflected wave. In S84, the calculator 13 calculates a time period from the emission of the ultrasonic pulse in S81 to the detection of the reflected pulse as the turnaround time of the ultrasonic wave. Next, the calculator 13 multiplies the time period by a propagation speed of the ultrasonic wave and thereby calculates a round-trip distance that the ultrasonic wave has traveled. After that, the calculator 13 divides the calculated round-trip distance by 2 to obtain the distance between the measuring device 10 and the object (S85).

Operations in Rectangular Parallelepiped Measurement Mode

Figure 5:
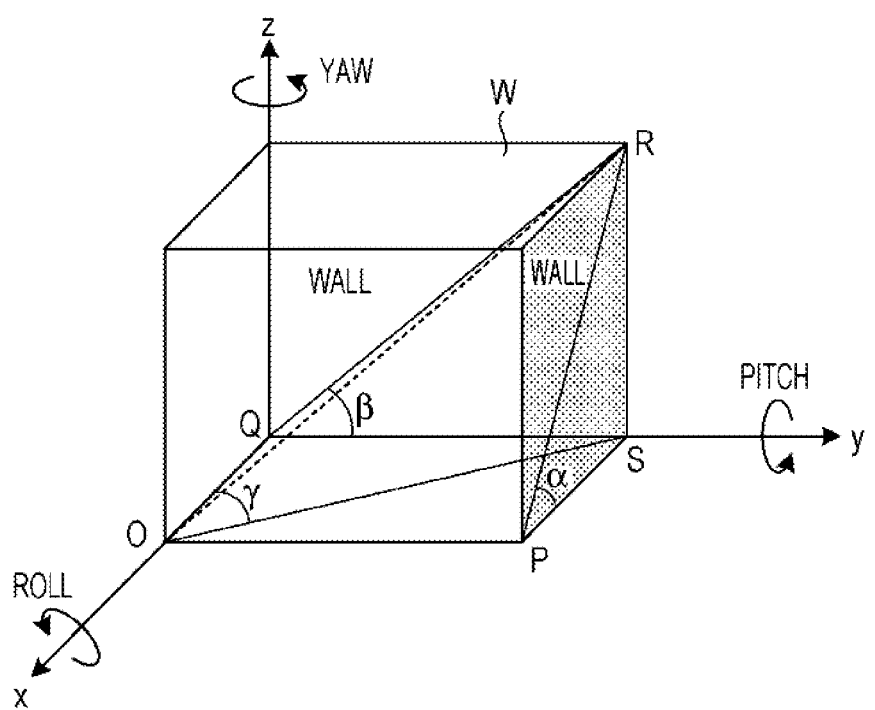
FIG. 5 is a diagram illustrating relationships among three axes, a measurement reference point, intersections, and sides of a rectangular parallelepiped in a rectangular parallelepiped measurement mode.

A measurement process performed in the rectangular parallelepiped measurement mode is described with reference to FIGS. 5 and 3B. FIG. 5 is a diagram illustrating relationships among the three axes, a measurement reference point O, intersections Q and R, and sides of a rectangular parallelepiped W in the rectangular parallelepiped measurement mode. As illustrated in FIG. 5, the rectangular parallelepiped W is measured, while the rectangular parallelepiped object to be measured is in contact with at least one wall (yz-plane in FIG. 5). The object, however, is not necessarily placed in reality. Referring to FIG. 5, ∠RPS is a pitch angle α, ∠RQS is a roll angle β, and ∠SOQ is a yaw angle γ. The measuring device 10 calculates the length OQ, width SQ, and height SR of the rectangular parallelepiped W based on coordinates of the measurement reference point O, a position at which the measuring device 10 is installed, and intersections Q and R at which the ultrasonic pulses emitted from the measurement reference point O intersect the wall.

FIG. 3B is a flowchart of the measurement process that is performed in the rectangular parallelepiped measurement mode. In T1, the user installs the measuring device 10 at the measurement reference point O and presses a button for emitting the ultrasonic pulse toward the point Q at which the x, y, and z axes are intersect each other. In T2, the measuring device 10 uses the ultrasonic sensor 111 and the calculator 13 to measure the distance OQ between the measurement reference point O and the intersection Q at which the ultrasonic pulse propagating in the x-direction intersects the wall, as indicated by S8 of FIG. 3A. In T3, the user installs the measuring device 10 at the measurement reference point O and presses a button for emitting the ultrasonic pulse toward the desired point R located on the yz-plane, in the same manner as T1.

In T4, the measurement device 10 measures a distance OR and calculates the pitch angle α, the roll angle β, and the yaw angle γ when the button is pressed in T3. Specifically, the measuring device 10 uses the ultrasonic sensor 111 and the calculator 13 to measure the distance OR between the measurement reference point O and the intersection R of the ultrasonic pulse and the wall, in the same manner as T2. Next, the measuring device 10 uses the acceleration sensor 112, the geomagnetic sensor 113, and the calculator 13 to calculate the pitch angle α, the roll angle β, and the yaw angle γ, as indicated by S4 to S7 of FIG. 3A. Then, in T5, the calculator 13 calculates the lengths of the sides (length OQ, width SQ, and height SR) of the rectangular parallelepiped W using the value of distance OQ measured in T2 and the values of the pitch angle α and yaw angle γ calculated in T4. The calculator 13 calculates the width SQ on the basis of a value obtained by multiplying the distance OQ by tan γ, and calculates the height SR on the basis of a value obtained by multiplying the distance OQ by tan α.

Operations in Human Body Circumference Measurement Mode

Next, a measurement process that is performed in the human body circumference measurement mode is described with reference to FIGS. 6, 3C, and 7. The present embodiment assumes that the circumference of the human body is an ellipse and the measuring device 10 measures the circumference of the human body by calculating the circumference of the ellipse.

Figure 6:
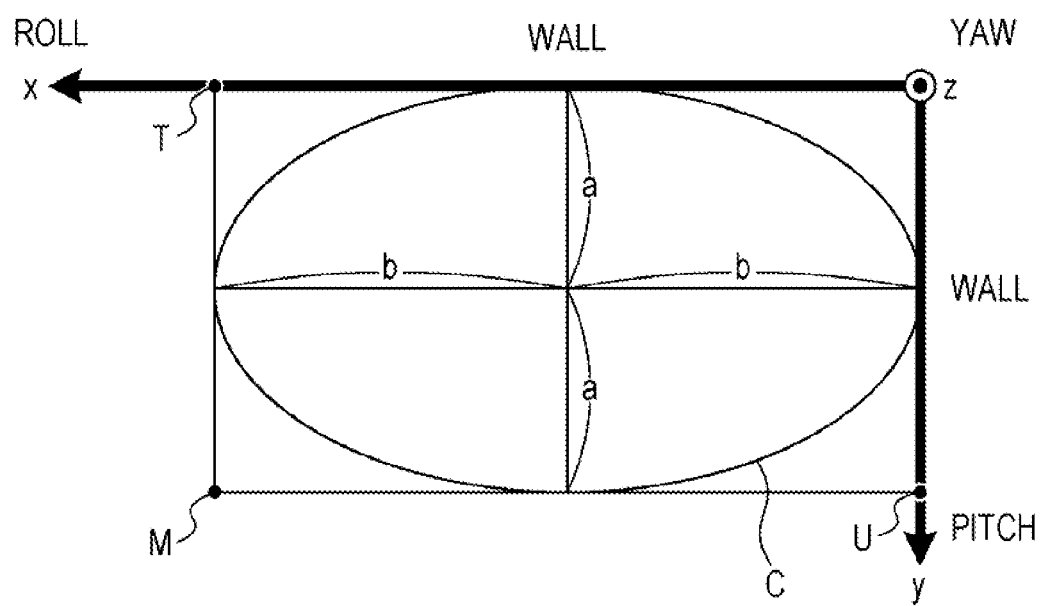
FIG. 6 is a diagram illustrating relationships among the three axes, a measurement reference point, intersections, and a circumference of a human body in a human body circumference measurement mode.
Figure 7:
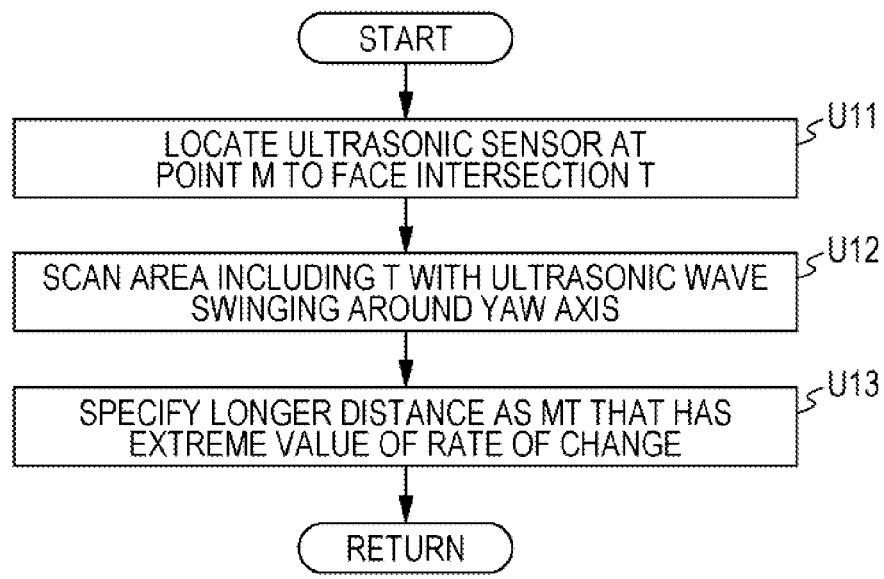
FIG. 7 is a flowchart of a process of measuring a distance.

FIG. 6 is a diagram illustrating relationships among the three axes, a measurement reference point M, intersections T and U, and a circumference C of a human body. As illustrated in FIG. 6, the circumference C of the human body is measured, while the waist of the human body to be measured is pressed against two walls, that is, xz-plane and yz-plane, that form an L shape. The measuring device 10 calculates the circumference C as an abdominal circumference of the human body based on the coordinates of the measurement reference point M at which the measuring device 10 is installed, and the intersections T and U of the wall and the ultrasonic pulse emitted by the measuring device 10.

FIG. 3C is a flowchart of the measurement process that is performed in the human body circumference measurement mode. In U1, the measuring device 10 uses the ultrasonic sensor 111 and the calculator 13 and thereby measures a distance MT between the measurement reference point M and the intersection T of the wall, or xz-plane, and the ultrasonic pulse propagating in the y-direction, as indicated by S8 of FIG. 3A. FIG. 7 is a flowchart of a process of measuring the distance MT. In U11, the user causes the ultrasonic pulse to be emitted toward the intersection T from the measuring device 10 located at the measurement reference point M. In U12, the user causes the ultrasonic pulse with which the wall has been irradiated to swing around the intersection T in a horizontal yaw direction, that is, rotational direction of the z axis, several times. In U13, the calculator 13 references information of distances periodically extracted in S3, and specifies, as the distance MT, a longer one of two distances calculated consecutively where the difference between the two distances is largest. Returning to FIG. 3C, in U1, the calculator 13 divides the distance MT by 2 and treats the result of the division as a value "a". The value "a" (=MT/2) is stored in the memory 10c.

Figure 8:
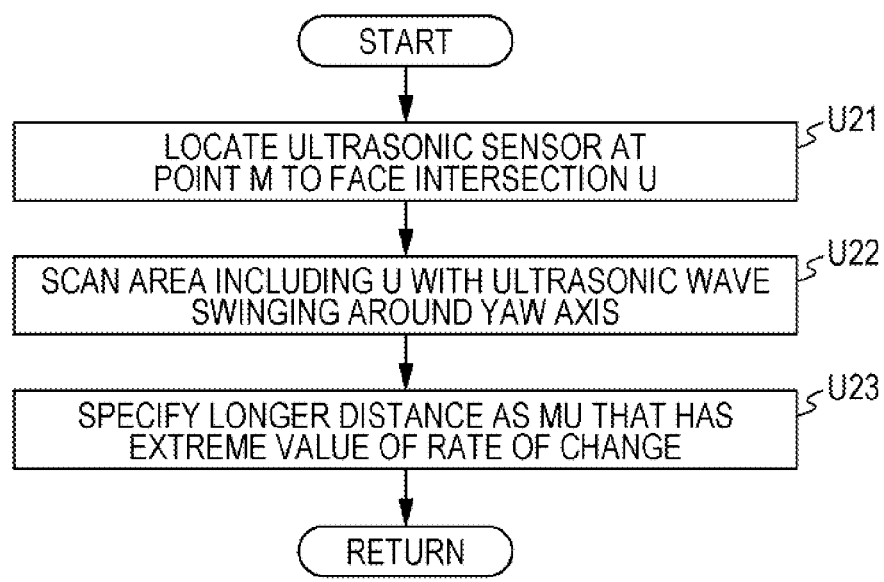
FIG. 8 is a flowchart of a process of measuring another distance.

In U2, the measuring device 10 sets the yaw angle to 90 degrees and measures a distance MU between the measurement reference point M and the intersection U of the other wall, or, yz-plane and the ultrasonic pulse propagating in the x-direction in the same manner as U1. FIG. 8 is a flowchart of a process of measuring the distance MU. The process illustrated in FIG. 8 is the same as the process illustrated in FIG. 7 except that the intersection of the wall and the ultrasonic pulse emitted from the measurement reference point M is the intersection U in the process illustrated in FIG. 8. Common stages in the processes illustrated in FIGS. 7 and 8 are indicated with the same last numbers, and a detailed description thereof is omitted. Specifically, U21 to U23 correspond to U11 to U13 illustrated in FIG. 7. In U2, the calculator 13 divides the distance MU by 2 and treats the result of the division as a value "b" in the same manner as U1. The value "b" (=MU/2) is stored in the memory 10c.

In U1 and U2, the user may press a button or the like and manually determine the position of the measurement reference point M. In U1 and U2, the measuring device 10 may automatically determine the position of the measurement reference point M. As a method for determining whether or not the position of the measurement reference point M has been determined so that the measuring device 10 may perform an accurate measurement, the following first to third methods may be performed, for example. In the first method, the ultrasonic sensor 111 determines, on the basis of the received ultrasonic pulse, whether or not the position of the measurement reference point M has been determined so that the measuring device 10 may perform the accurate measurement. Specifically, the ultrasonic sensor 111 monitors the ratio of the reflected wave to the ultrasonic wave emitted toward the wall. When the ratio is equal to or higher than a predetermined threshold, for example, 95%, the ultrasonic sensor 111 determines that the position of the measurement reference point M has been determined so that the measuring device 10 may perform the accurate measurement. In the second method, the calculator 13 compares the distance MT with the distance MU. When the distance MU is larger than the distance MT, the calculator 13 estimates that the position of the measurement reference point M has been determined so that the measuring device 10 may perform the accurate measurement. In the third method, a laser pointer is provided in the measuring device 10. Specifically, the laser pointer of the measuring device 10 emits a red laser in the same direction as the direction in which the ultrasonic wave that is emitted by the ultrasonic sensor 111 propagates. The measurement reference point M is gradually moved from the inside of the object to the outside of the object. The position of the measurement reference point M when the wall is irradiated with the red laser is determined as a position at which the measuring device 10 may perform the accurate measurement. In the third method, the laser pointer may individually emit lasers in the direction connecting the measurement reference point M and point T to each other and the direction connecting the measurement reference point M and point U to each other. In this case, the lasers may be simultaneously emitted in both direction connecting the measurement reference point M and point T to each other and direction connecting the measurement reference point M and point U to each other.

In U3, the calculator 13 acquires the values "a" and "b" from the memory 10c, substitutes the values "a" and "b" in a predetermined equation and calculates the circumference C of the human body. When an ellipse whose minor axis is equal to the distance MT and whose major axis is equal to the distance MU is considered, the following Equation (4) that is an approximate equation for the ellipse may be used as the predetermined equation, for example. The result of the calculation of the circumference C of the human body is displayed on the display device 10d.

$$\text{The circumference } C \text{ of a human body} = \pi[3(a+b) - \sqrt{\{10ab+3(a*a+b*b)\}}] \quad (4)$$

In U3, the measuring device 10 may calculate and display the circumference C of the human body and the area of ellipse obtained by the equation the area=πab. In this case, the user may easily know not only the size of the waist of the user but also the cross-sectional area of the abdomen.

As described above, the measuring device 10 according to the embodiment includes the ultrasonic sensor 111, the acceleration sensor 112, the geomagnetic sensor 113 and the calculator 13. The ultrasonic sensor 111 measures a distance between a predetermined measurement reference point and an intersection of a plane or wall and a line passing through the measurement reference point. The acceleration sensor 112 and the geomagnetic sensor 113 calculate an angle formed by the measurement reference point and the intersection. The calculator 13 measures an object using the measured distance or the calculated angle.

In the rectangular parallelepiped measurement mode, there are the plurality of intersections (points Q and R illustrated in FIG. 5) of the wall with the lines OQ and OR passing through the measurement reference point, (point O illustrated in FIG. 5). The calculator 13 measures the lengths of the sides OQ, SQ and SR of the rectangular parallelepiped W using the measured distance (distance OQ illustrated in FIG. 5) and the calculated angles (angles α and γ illustrated in FIG. 5). In the human body circumference measurement mode, there are the plurality of intersections (points T and U illustrated in FIG. 6) of the planes and the lines MT and MU passing through the measurement reference point (point M illustrated in FIG. 6). The calculator 13 measures the circumference C of the human body using the measured distances (distances MT and MU illustrated in FIG. 6).

The user uses the measuring device 10 according to the embodiment to measure quickly the sizes of an object such as the lengths of sides of a rectangular parallelepiped or an abdominal circumference of a human body through an easy operation such as pressing of a button located at a predetermined position. The measuring device 10 may measure the size of an object to be measured without contact of the measuring device 10 with the object. Thus, even when the user does not have a measuring tool such as a measure or measures an object that is too high for the user to reach, or even when a person that holds a measure or the like is not present, the measuring device 10 may measure the size of the object. Especially, the measuring device 10 may measure the size of an object that is a rectangular parallelepiped, even when the real thing as the object to be measured does not exist. Thus, when the user wants to confirm an available space of a room in which a furniture, a home electrical appliance or the like are to be placed before purchase of the furniture, the home electrical appliance or the like, the measuring device 10 is suitable to measure the available space.

Measurement Program

The various processes described in the embodiment may be achieved by causing a computer to execute a prepared measurement program. With reference to FIG. 9, there will be described an example of the computer for executing the measurement program including the same functions as the measuring device 10 illustrated in FIG. 1.

FIG. 9 is a diagram illustrating a computer 100 that executes the measurement program indicated by reference numeral 201. As illustrated in FIG. 9, the computer 100 includes a CPU 110, an input device 120, a monitor 130, an audio input and output device 140, a wireless communication device 150, an ultrasonic sensor 160, an acceleration sensor 170 and a geomagnetic sensor 180. The computer 100 further includes a RAM 190 and a data storage device such as a hard disk device 200. The aforementioned parts included in the computer 100 are connected to each other through a bus 210. The CPU 110 performs various types of arithmetic processing. The input device 120 receives data input by the user. The monitor 130 displays various types of information. The audio input and output device 140 receives and output a sound. The wireless communication device 150 transmits and receives data to and from another computer through wireless communication. The ultrasonic sensor 160 detects a reflected wave of an ultrasonic pulse. The acceleration sensor 170 detects acceleration in the three axial directions. The geomagnetic sensor 180 detects geomagnetic fields in the three axial directions. The RAM 190 temporarily stores various types of information.

The hard disk device 200 stores the measurement program 201 that includes the same functions as the CPU 10a illustrated in FIG. 2. In addition, the hard disk device 200 stores data 202 on the measurement processes and a measurement history file 203. The data 202 and the measurement history file 203 correspond to the data, for example, sensing results and extracted values of the acceleration, geomagnetic fields and the like, stored in the memory 10c illustrated in FIG. 2.

The CPU 110 reads the measurement program 201 from the hard disk device 200 into the RAM 190 to make the measurement program 201 function as a measurement process 191. The measurement process 191 causes information read from the data 202 and the like to be developed appropriately in a region in the RAM 190 which has been allocated for the information and the like. The measurement process 191 causes various types of data processing to be executed on the basis of the developed information and the like. Then, the measurement process 191 causes predetermined information to be output to the measurement history file 203.

The measurement program 201 may not be stored in the hard disk device 200. The measurement program 201 may be stored in a storage medium such as a CD-ROM to be read and executed by the computer 100. In addition, the measurement program 201 may be stored in another computer or a server or the like that is connected to the computer 100 through a public circuit, the Internet, a local area network (LAN), a wide area network (WAN) or the like. In this case, the computer 100 reads the measurement program 201 from the other computer to execute the measurement program 201.

The embodiment assumes that the circumference of the human body is the ellipse. Human bodies, however, vary depending on the persons. The ellipsoidal circumference does not necessarily match the actual circumference value of the human body in some cases. For such a case, the application processor 14 may include a human body circumference correction table that may be updated. The application processor 14 may reference the human body circumference correction table so as to correct a result of the calculation performed by the calculator 13 of the circumference C of the human body. FIG. 10 is a diagram illustrating an example of data stored in a human body circumference correction table 141 that is used to convert estimated values of calculations performed by the calculator 13 of circumferences C of human bodies into actual measured values. As illustrated in FIG. 10, values that represent the circumferences C of the human bodies calculated by the calculator 13 are stored in the human body circumference correction table 141 and are associated with "actual measured values" that are the lengths of the abdominal circumferences measured using a measuring tape or the like. For example, when the circumference C of the human body is calculated as "53 cm", a value "51 cm" may be displayed. This is due to the fact that the actual value of the abdominal circumference is set to "51 cm" for the calculated value "53 cm" in advance. When a value that is calculated by the calculator 13 and represents the circumference C of the human body is "77 cm", a value "74 cm" may be displayed for the user. This is due to the fact that the actual value of the abdominal circumference is set to "74 cm" for the calculated value "77 cm" in advance. In this manner, the values that represent the circumferences C of the human bodies and are calculated by the calculator 13 are corrected and converted into the actual measured values by the application processor 14.

A relationship set in the human body circumference correction table 141, which illustrates a relationship between the calculated values and the actual measured values of the circumferences C of the human bodies, may be updated on the basis of the lengths of the abdominal circumferences actually measured using the measuring tape or the like. Specifically, the application processor 14 updates the relationship set in the human body circumference correction table 141 on the basis of characteristics of the users in shape of body or the abdominal circumferences or the accuracy of calculation so that the latest information may usually be found. Thus, the application processor 14 references the human body circumference correction table 141 and may estimate the circumferences of the human bodies on the basis of the nearly accurate values of the circumferences of the human bodies. Thus, the measuring device 10 may obtain results of measurements with higher accuracy. As a result, the reliability of the measuring device 10 is improved.

The embodiment assumes that the measuring device 10 is the mobile phone. The measuring device 10 is not limited to the mobile phone and may be a smart phone, a personal digital assistant (PDA), an electronic device that does not have a communication function, or the like. The measuring device 10 may not have both rectangular parallelepiped measurement mode and human body circumference measurement mode. It is sufficient if the measuring device 10 has at least one of the rectangular parallelepiped measurement mode and the human body circumference measurement mode.

The constituent elements illustrated in FIG. 1 of the measuring device 10 may not be physically configured as illustrated in FIG. 1. Specifically, the detailed separations and integrations of the constituent elements are not limited to those illustrated in FIG. 1. All or a part of the constituent elements may be functionally or physically integrated or separated per arbitrary unit on the basis of loads and usage statuses. For example, the sensor unit 11 and the sampling processor 12, or the calculator 13 and the application processor 14, may be integrated into a single constituent element. Especially, the acceleration sensor 112 and the geomagnetic sensor 113, which are used to calculate an angle, may be replaced with a gyrosensor.

On the other hand, the functions of the calculator 13 and application processor 14 may be separated into functions to be used in the rectangular parallelepiped measurement mode and functions to be used in the human body circumference measurement mode. In addition, the functions of the calculator 13 may be separated into a function to be used to calculate a direction, a function to be used to calculate an angle, and a function to be used to calculate a distance. When the measuring device 10 includes two ultrasonic sensors 111 that emit ultrasonic waves in directions that form a right angle, the ultrasonic sensors 111 may not be turned in the human body circumference measurement mode. In this case, the number of user's operations is reduced, and a distance or the circumference of the human body may be accurately measured. In addition, the memory 10c may be arranged outside the measuring device 10 and connected to the measuring device 10 through a network, a cable or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A measuring device that measures the size of an object, the measuring device comprising:
  a non-contact distance sensor that emits waves toward the object and that measures a distance between the measuring device and the object based on the waves reflected and received from the object;
  a motion sensor that obtains, when a plurality of distance measurements is executed by the non-contact distance sensor, information on angles between emitting directions of each of the waves emitted for each of the plurality of distance measurements based on a motion of the non-contact distance sensor; and
  a processor that receives distances measured in each of the plurality of distance measurements by the non-contact distance sensor and the information on angles obtained by the motion sensor and that calculates the size of the object based on the received distances and the received information on angles.

\* \* \* \* \*